(12) United States Patent
Pistoia et al.

(10) Patent No.: US 11,240,853 B2
(45) Date of Patent: *Feb. 1, 2022

(54) SYSTEM, METHOD AND APPARATUS FOR SENSOR VIRTUALIZATION IN MOBILE DEVICES

(71) Applicant: International Business Machines Corporation, Armonk, NY (US)

(72) Inventors: Marco Pistoia, Amawalk, NY (US); Gegi Thomas, Piermont, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/724,623

(22) Filed: Dec. 23, 2019

(65) Prior Publication Data
US 2020/0128593 A1    Apr. 23, 2020

Related U.S. Application Data

(63) Continuation of application No. 16/041,946, filed on Jul. 23, 2018, now Pat. No. 10,548,172, which is a
(Continued)

(51) Int. Cl.
*H04W 4/021* (2018.01)
*H04W 76/10* (2018.01)
(Continued)

(52) U.S. Cl.
CPC ........... *H04W 76/10* (2018.02); *H04W 12/08* (2013.01); *H04W 84/18* (2013.01)

(58) Field of Classification Search
None
See application file for complete search history.

(56) References Cited

U.S. PATENT DOCUMENTS 7,546,373 B2    6/2009  Lehew
8,224,246 B2 *  7/2012  Suumaki ............ G06K 7/10237
                                                        455/41.1
(Continued)

OTHER PUBLICATIONS

Davidovic et al., "ArdSense: extending mobile phone sensing capabilities using open source hardware for new Citizens as Sensors based applications", AGILE 2013, Leuven, May 14-27, 2013, pp. 1-6.
(Continued)

*Primary Examiner* — Sithu Ko
(74) *Attorney, Agent, or Firm* — Scully, Scott, Murphy & Presser, PC; Daniel P. Morris, Esq.

(57) ABSTRACT

A method and system for virtualizing mobile device sensors includes requesting from a first mobile device a virtual connection with a mobile device having a specific type of sensor, configuring an operating system of the first mobile device to allow an application program to accept data by proxy from the available sensor of the second mobile device; receiving a response from a second mobile device having the sensor, establishing a trusted temporary communication connection between the first and second mobile devices, sending a control signal from an application program on the first mobile device to the second mobile for operating the sensor on the second mobile device and receiving device sensor data from the sensor on the second mobile device.

20 Claims, 3 Drawing Sheets

Related U.S. Application Data continuation of application No. 15/193,798, filed on Jun. 27, 2016, now Pat. No. 10,080,248.

(51) Int. Cl.
*H04W 12/08* (2021.01)
*H04W 84/18* (2009.01)

(56) References Cited

U.S. PATENT DOCUMENTS

| | | | |
|---|---|---|---|
| 8,775,337 B2* | 7/2014 | Bahl | G01D 1/00 |
| | | | 706/12 |
| 9,256,222 B2* | 2/2016 | Blount | G06F 9/45558 |
| 9,451,043 B2* | 9/2016 | Zhao | H04L 67/08 |
| 2009/0036111 A1 | 2/2009 | Danford | |
| 2011/0275316 A1 | 11/2011 | Suumaki | |
| 2013/0065627 A1 | 3/2013 | Jung | |
| 2013/0148149 A1 | 6/2013 | Park | |
| 2013/0159223 A1* | 6/2013 | Bahl | G01D 1/00 |
| | | | 706/12 |
| 2014/0025337 A1* | 1/2014 | Blount | G06F 9/45558 |
| | | | 702/183 |
| 2014/0068007 A1* | 3/2014 | O'Gorman | H04N 7/15 |
| | | | 709/219 |
| 2014/0148098 A1* | 5/2014 | Song | H04W 76/14 |
| | | | 455/41.1 |
| 2014/0368867 A1* | 12/2014 | Kim | G06F 3/1226 |
| | | | 358/1.15 |
| 2015/0036191 A1* | 2/2015 | Suzuki | G06F 3/1253 |
| | | | 358/1.15 |
| 2015/0249902 A1 | 9/2015 | Gemeto | |
| 2015/0296416 A1 | 10/2015 | Lee et al. | |
| 2016/0044035 A1* | 2/2016 | Huang | H04L 41/0806 |
| | | | 726/4 |
| 2016/0150368 A1* | 5/2016 | Wouhaybi | H04W 4/021 |
| | | | 455/456.1 |
| 2016/0150412 A1 | 5/2016 | Liu | |

OTHER PUBLICATIONS

Kansal et al., "Location and Mobility in a Sensor Network of Mobile Phones", NOSSDAV '07, Urbana, Illinois USA, pp. 1-6.
Mell, P. et al., "The NIST Definition of Cloud Computing", NIST Special Publication 800-145, National Institute of Standards and Technology, U.S. Department of Commerce, Sep. 2011, pp. 1-7.
List of IBM Patents or Patent Applications Treated as Related, dated Dec. 23, 2019, pp. 2.

\* cited by examiner

SYSTEM, METHOD AND APPARATUS FOR SENSOR VIRTUALIZATION IN MOBILE DEVICES

BACKGROUND OF THE INVENTION

This disclosure is directed to the use of mobile device sensors and more particularly to the virtualization of mobile device sensors.

Mobile devices are becoming increasingly complex and are regarded as first-class citizens in the landscape of computing. Devices contain increasingly sophisticated onboard sensors which allow for complex application features.

Current implementations of mobile technology require applications to exclusively use sensors that are housed onboard the current device. This has the advantage of increased security for the application operating environment. However this requires that all peer/neighboring mobile devices be treated as foreign. This implementation of design results in the lack of efficient use of mobile computing resources.

One system has been proposed whereby many mobile devices collectively measure environmental data. The proposed system describes particular hardware extensions to enable more sensing capabilities.

In another proposed system, the sensors from many mobile devices worldwide are used to sample a required region. The proposed system has a layer of static virtual sensor nodes corresponding to the sampled data locations.

There are current techniques that allow for the transfer of data between peer devices. Examples include Airdrop® functionality between iOS® devices, Bluetooth® connectivity between enabled mobile devices and peer-to-peer transfer of data over WiFi. However, these approaches all employ onboard sensors to facilitate the transfer of information.

SUMMARY OF THE INVENTION

In one embodiment of the invention, mobile device sensors are virtualized whereby a first mobile device assists a second mobile device by sharing sensor of the second mobile device. An operating system of the first mobile device is configured to allow an application program to accept data by proxy from the available sensor of the second mobile device. The devices enter a trust relationship, resulting in an increase in efficiency by allowing for enhanced application functionality.

One embodiment of a method for virtualizing mobile device sensors includes requesting from a first mobile device a virtual connection with a mobile device having a specific type of sensor, receiving at the first mobile device a response from a second mobile device having the specific type of sensor, establishing a trusted temporary communication connection between the first and second mobile devices, sending a control signal from the first mobile device to the second mobile for operating the specific type of sensor on the second mobile device and receiving at the first mobile device sensor data from the specific type of sensor on the second mobile device generated in response to the control signal for operating of the specific type of sensor. In one embodiment, the method includes coupling an operating system of the first mobile device with the application program requiring the operation of the specific type of sensor such that the data from the specific type of sensor is not required to be from a sensor on the first mobile device. In one embodiment, the coupling is provided by a virtual machine monitor running on the first mobile device such that the first mobile device is a host machine and the second mobile device is a guest machine.

One embodiment of a system includes at least one data processor connected to at least one memory that stores software instructions, where execution of the software instructions by the at least one data processor causes the system to virtualize mobile device sensors by requesting from a first mobile device a virtual connection with a mobile device having a specific type of sensor, receiving at the first mobile device a response from a second mobile device having the specific type of sensor, establishing a trusted temporary communication connection between the first and second mobile devices, sending a control signal from the first mobile device to the second mobile for operating the specific type of sensor on the second mobile device and receiving at the first mobile device sensor data from the specific type of sensor on second mobile device generated in response to the control signal for operating of the specific type of sensor. In one embodiment, the system includes an operating system of the first mobile device coupled with the application program requiring the operation of the specific type of sensor such that the data from the specific type of sensor is not required to be from a sensor on the first mobile device. In one embodiment, the system includes a virtual machine monitor such that the first mobile device is a host machine and the second mobile device is a guest machine.

In one embodiment a computer program product includes software instructions on a non-transitory computer-readable medium, where execution of the software instructions using a computer causes the computer to virtualize mobile device sensors by requesting from a first mobile device a virtual connection with a mobile device having a specific type of sensor, receiving at the first mobile device a response from a second mobile device having the specific type of sensor, establishing a trusted temporary communication connection between the first and second mobile devices, sending a control signal from the first mobile device to the second mobile for operating the specific type of sensor on the second mobile device and receiving at the first mobile device sensor data from the specific type of sensor on second mobile device generated in response to the control signal for operating of the specific type of sensor.

DETAILED DESCRIPTION OF PREFERRED EMBODIMENTS

Neighboring mobile devices may have differing mobile computing resources and/or sensors, such that an application running on either device could provide customized functionality based on whatever sensors are on board the mobile device upon which the application operates. Examples of mobile device sensors include, but are not limited to camera, LED flash, near-field communications, displays, Bluetooth® or Wi-Fi connectivity, etc.

One embodiment of the invention is directed to virtualizing mobile sensors onboard a device such that all the sensor capability can be delegated to a trusted neighboring device. The advantage of this invention is that it optimizes the resources between both mobile devices. The invention takes advantage of the fact that mobile devices are highly heterogeneous in terms of their hardware capabilities. They carry different sensors, they have different battery levels, etc. This invention solves the problem where one device is in need of a function that it cannot perform on it's own. Such examples are where the battery level is too low or where no onboard sensor exists on the executing device. In these situations, the device can ask a neighboring trusted device to execute the operation upon it's available sensor, thereby treating the required sensor as a proxy, and sharing the resulting data from the operation to the requesting device.

Application software running exclusively on a mobile device requires the immediate execution environment/system of the mobile device to operate. As the application operates, it has the potential to invoke on-board sensors to execute specific functions that contribute to the operational integrity of the application. However, as the state of the mobile device changes (i.e., battery diminishes, connectivity decreases, sensors malfunction, etc), the invocation of a sensor to accomplish a task maybe unachievable. Alternatively, the execution of a specific function may be conditionally prerequisite on the availability of an onboard sensor, which may not exist on the mobile device upon which the application is executing upon (e.g. older generation device).

In one example, a mobile application requires the use of a camera onboard a peer mobile device that is closer in proximity to the subject being captured. In another example, a mobile application requests the use of a peer mobile device's LTE data connection to facilitate high-bandwidth transfer of data. In another example, the mobile application of the host device leverages the onboard NFC sensor of a peer mobile device to complete a transaction. In these examples, one mobile device assists another mobile device by sharing it's sensor, where these devices enter a trust relationship, allowing for an increase in efficiency by allowing for enhanced application functionality.

In one embodiment, a coupling between the software application and the mobile device is such that the sensors aboard the mobile device can be virtualized and made available by proxy to other mobile devices that are able to enter into a temporal state with a requesting peer mobile device. In one embodiment, the coupling is provided by a virtual machine monitor running on the first mobile device such that the first mobile device is a host machine and the second mobile device is a guest machine.

Automatic recognition of an available sensor between peer mobile devices can successfully allow for the device's resources to be made available to an executing application. This has the potential to directly impact the quality of the application's execution, thereby improving the user experience as well as mobile device resource longevity.

There are current techniques that allow for the transfer of data between peer devices. Examples include Airdrop® functionality between iOS® devices, Bluetooth® connectivity between enabled mobile devices, and peer-to-peer transfer of data over WiFi. These approaches can be used to facilitate the transfer of information from the host device to the guest device.

Figure 1:
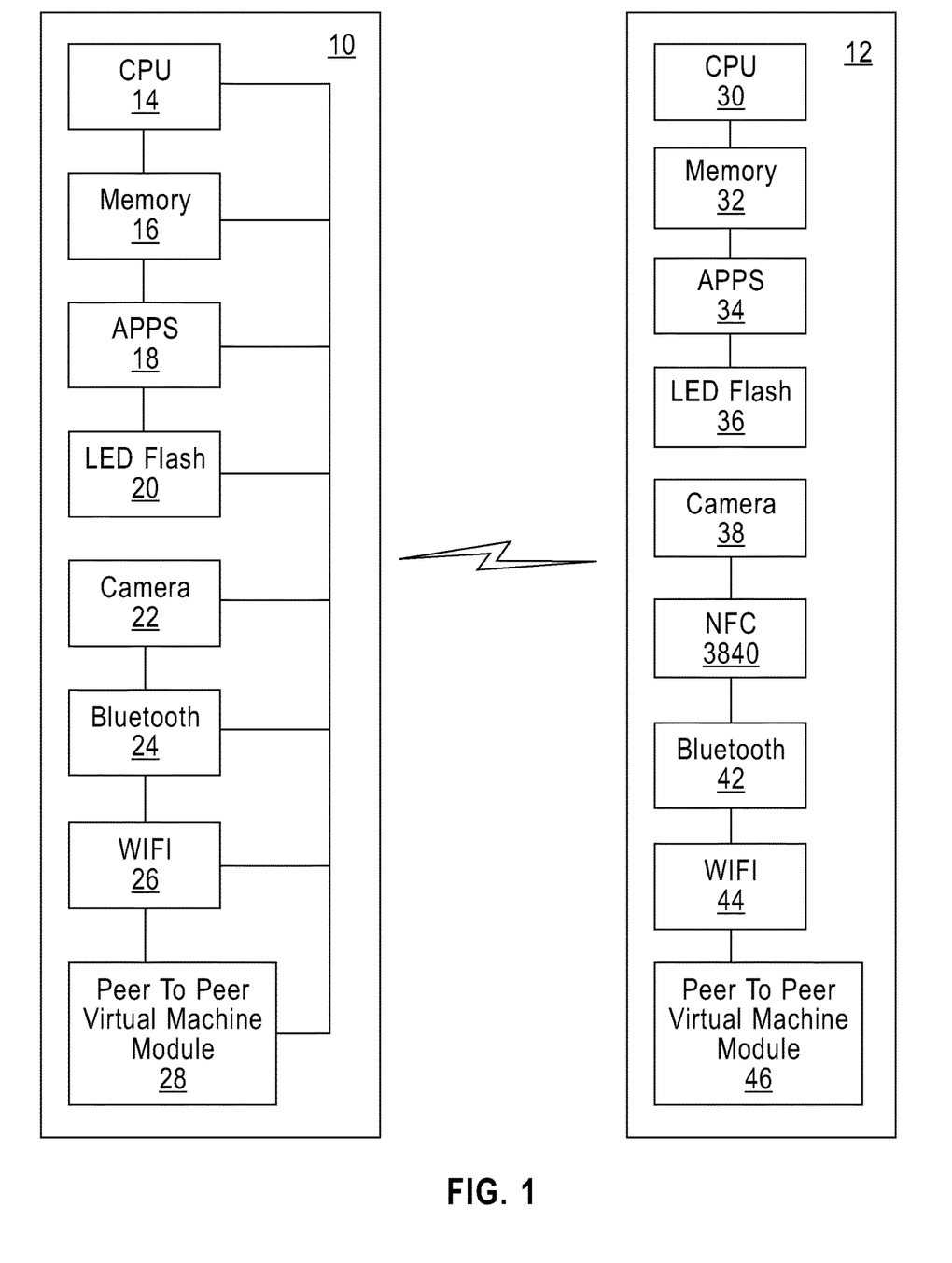
FIG. 1 is a block diagram of one embodiment of a system of the invention.

FIG. 1 depicts a first mobile device 10 and a second mobile device 12. First mobile device 10 includes a CPU 14, a memory 16 and one or more software applications 18. Mobile device 10 includes onboard sensors LED flash 20, camera 22, Bluetooth® 24, and WiFi 26. Mobile device 10 also includes peer-to-peer virtual machine module 28. FIG. 1 also depicts second mobile device 12 having a CPU 30, a memory 32 and one or more software applications 34. Mobile device 12 includes onboard sensors LED flash 36, camera 38, NFC 40, Bluetooth® 42 and WiFi 44. Mobile device 12 also includes peer-to-peer virtual machine module 46.

Figure 2:
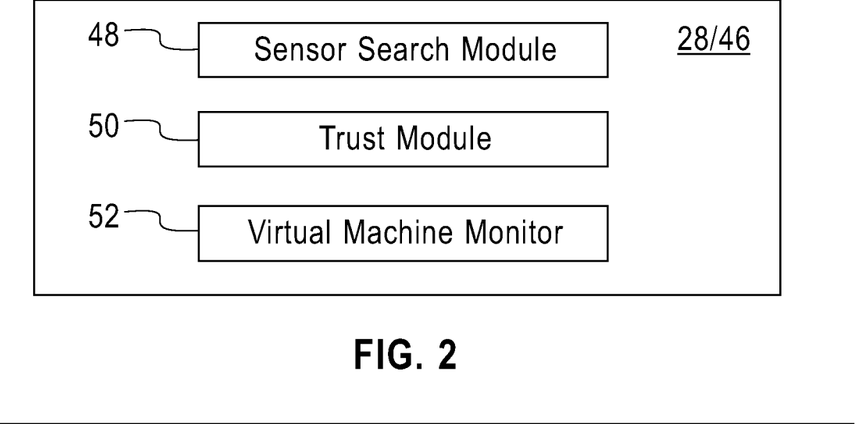
FIG. 2 is a block diagram of one embodiment of a peer-to-peer virtual machine module of the invention.

FIG. 2 depicts a virtual machine module 28/46 which includes a sensor search module 48, a trust module 50 and a virtual machine monitor 52. The virtual machine monitor 52 couples the operating system of the first mobile device with the application program requiring the operation of the specific type of sensor such that the data from the specific type of sensor is not required to be onboard a sensor on the first mobile device. In one embodiment, the coupling is provided by a virtual machine monitor running on the first mobile device such that the first mobile device is a host machine and the second mobile device is a guest machine.

Figure 3:
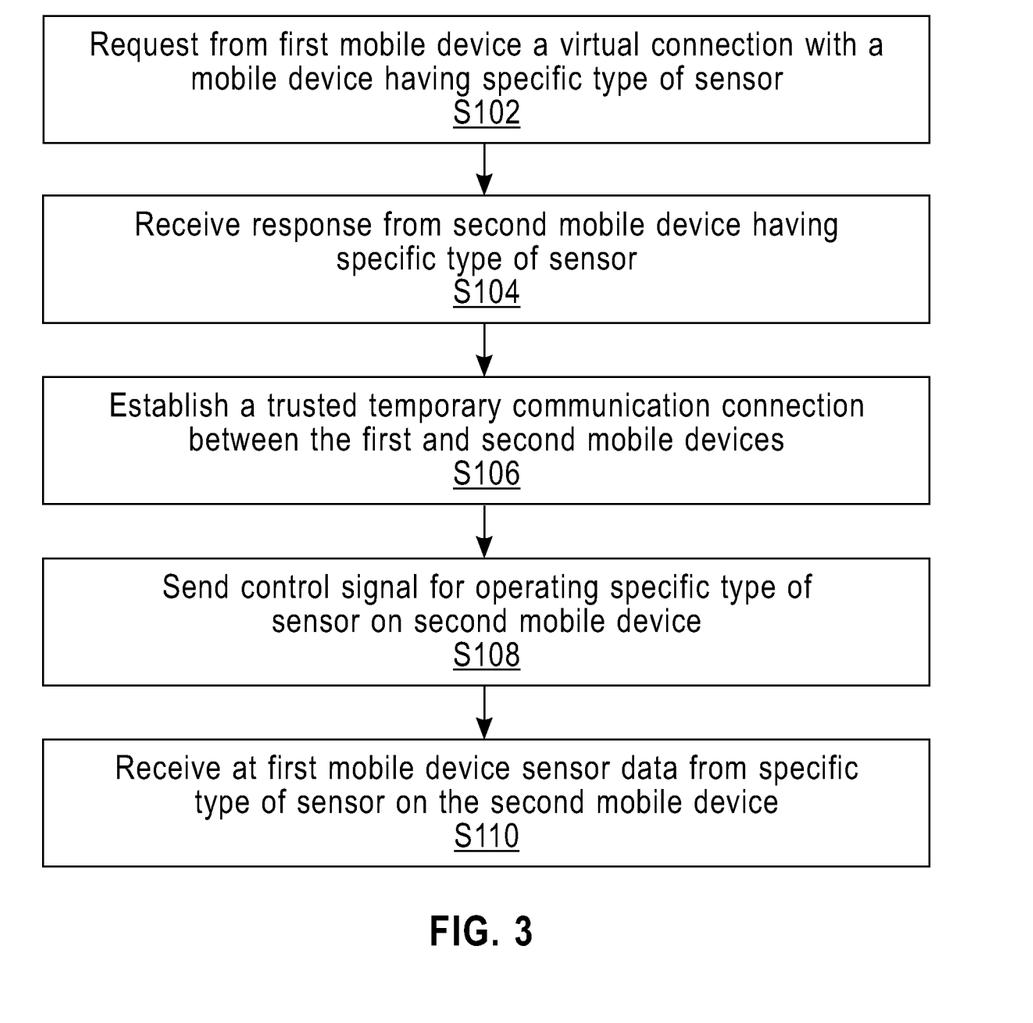
FIG. 3 is a flow chart of one embodiment of a method of the invention.

FIG. 3 depicts a flow chart of one embodiment of a method for virtualizing mobile device sensors. The method includes at step S102 requesting from the first mobile device 10 a virtual connection with a mobile device having a specific type of sensor. In tone example, the mobile application 18 requires use of an NFC sensor to perform a task, for example, printing to a NFC enabled printer. The search sensor module 48 sends a signal through Bluetooth® and/or WiFi seeking mobile devices having an NFC sensor and also having the peer-to-peer virtual machine module. In step S104 the first mobile device 10 receives a response from a second mobile device 12 having the specific type of sensor. In this example, second mobile device 12 has an NFC sensor 38 that the first mobile device does not have. The trust modules 50 in each of the mobile devices 10 and 12 establish in step S106 a trusted temporary communication connection between with first and second mobile devices. This connection can be using well known secure handshake techniques. In step S108, the virtual machine monitor sends a control signal from the first mobile device 10 to the second mobile device 12 for operating the specific type of sensor on the second mobile device. The control signal is this example includes the data to be printed. The virtual device monitor on the second mobile device 12 activates the NFC sensor causing the data to be printed by an NFC enabled printer in the vicinity of the second mobile device. In another example, the camera LED flash function cannot be operated by the first mobile device and the control signal includes a signal for operation of the flash on the second mobile device. In step S110, the first mobile device receives sensor data from the specific type of sensor on the second mobile device generated in response to the control signal for operating of the specific type of sensor. In the NFC example, sensor data indicates that the printer function has been completed. In the LED flash example, the data indicates that the flash has been activated.

In many cases, cooperation between the users of the first and second mobile devices is required. For the NFC example, the user of the second mobile device must move the device in proximity to the NFC enabled printer. In the LED flash example, the user of the second mobile device must position the device so the flash is in the proper positron for the picture being taken by the first mobile device. In some cases, the date transferred from the second mobile device to the first mobile device can include the data from the sensor itself, such as when the first device controls the second device to take a picture.

Figure 4:
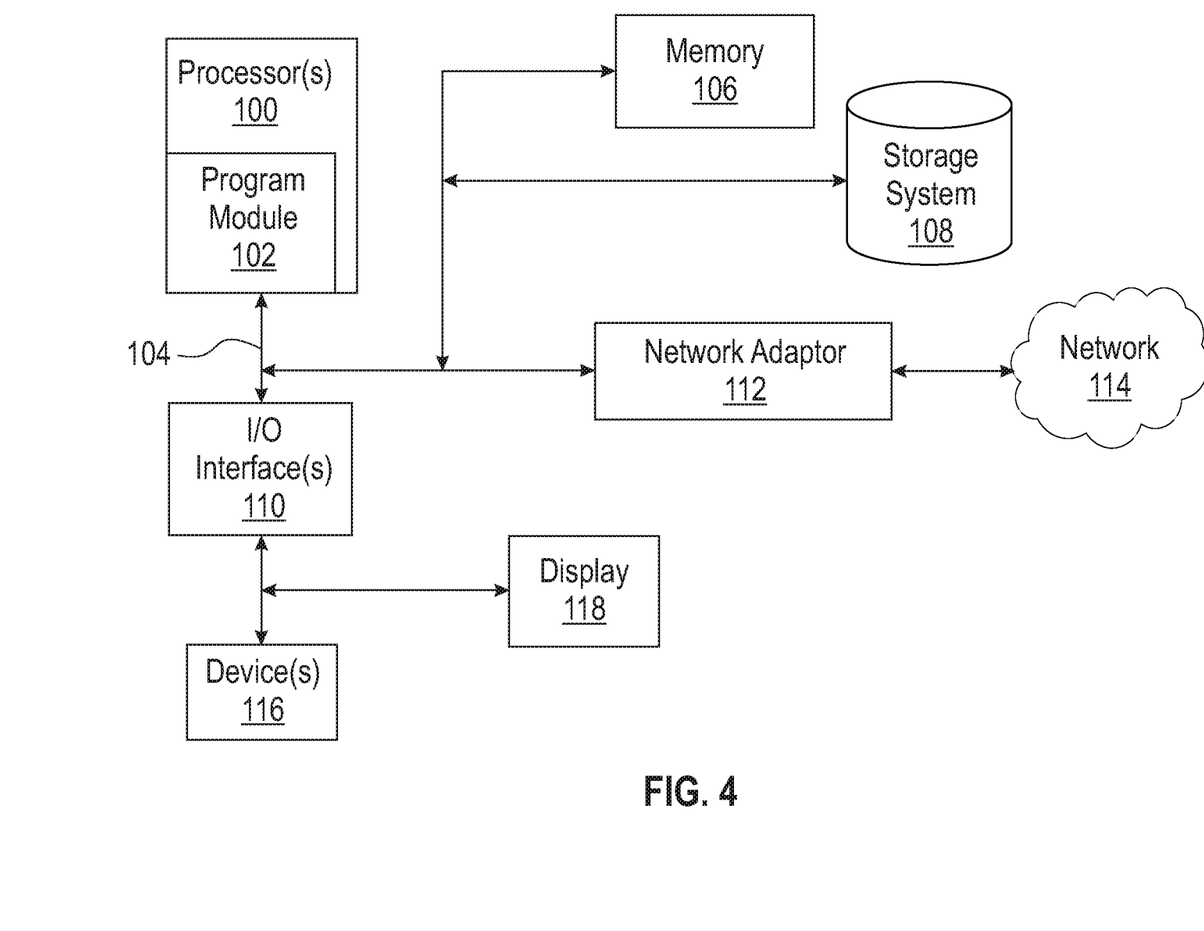
FIG. 4 is a block diagram of an exemplary computing system suitable for implementation of the embodiments of the invention disclosed in this specification.

FIG. 4 illustrates a schematic of an example computer or processing system that may implement the method for virtualizing mobile device sensors in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include mobile devices, but are not limited thereto, and can also include personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for virtualizing mobile device sensors comprising:
    automatically recognizing by a first mobile device an available specific type of sensor on a second mobile device;
    configuring an operating system of the first mobile device to allow an application program to accept data by proxy from the available specific type of sensor of the second mobile device;
    establishing a trusted communication connection between the first and second mobile devices;

sending a control signal from the first mobile device to the second mobile device for controlling the available specific type of sensor on the second mobile device to generate sensor data;
receiving at the first mobile device the sensor data from the available specific type of sensor on the second mobile device generated in response to the control signal for operating the available specific type of sensor; and
providing the sensor data received from the available specific type of sensor on the second mobile device by proxy to the application program requiring the operation of the available specific type of sensor.

2. The method of claim 1, wherein the control signal is generated by the application program on the first mobile device.

3. The method of claim 2, wherein the control signal is generated by the application program on the first mobile device requiring operation of the available specific type of sensor not on the first mobile device.

4. The method of claim 2, wherein the control signal is generated due to the available specific type of sensor not operating on the first mobile device.

5. The method of claim 2, further including coupling an operating system of the first mobile device with the application program requiring the operation of the available specific type of sensor such that the data from the available specific type of sensor is not required to be from a sensor on the first mobile device.

6. The method of claim 5, wherein the coupling is provided by a virtual machine monitor running on the first mobile device such that the first mobile device is a host machine and the second mobile device is a guest machine.

7. The method of claim 1, further including the first mobile device automatically recognizing one or more second mobile devices has being a trusted device and having the available specific type of sensor.

8. A system comprising:
at least one data processor connected to at least one memory that stores software instructions, where execution of the software instructions by the at least one data processor causes the system to virtualize mobile device sensors by:
automatically recognizing by a first mobile device an available specific type of sensor on a second mobile device;
configuring an operating system of the first mobile device to allow an application program to accept data by proxy from the available specific type of sensor of the second mobile device;
establishing a trusted communication connection between the first and second mobile devices;
sending a control signal from the first mobile device to the second mobile device for controlling the available specific type of sensor on the second mobile device to generate sensor data;
receiving at the first mobile device the sensor data from the available specific type of sensor on the second mobile device generated in response to the control signal for operating of the available specific type of sensor; and
providing the sensor data received from the available specific type of sensor on the second mobile device by proxy to the application program requiring the operation of the available specific type of sensor.

9. The system of claim 8, wherein the control signal is generated by the application program on the first mobile device.

10. The system of claim 8, wherein an operating system of the first mobile device is coupled with the application program requiring the operation of the available specific type of sensor such that the data from the available specific type of sensor is not required to be from a sensor on the first mobile device.

11. The system of claim 10, wherein a virtual machine monitor on first mobile device is configured such that the first mobile device is a host machine and the second mobile device is a guest machine.

12. The system of claim 8, further including the first mobile device automatically recognizing one or more second mobile devices has being a trusted device and having the available specific type of sensor.

13. The system of claim 9, wherein the control signal is generated by one of the application program on the first mobile device requiring operation of the available specific type of sensor not on the first mobile device and the available specific type of sensor not operating on the first mobile device.

14. A computer program product for virtualizing mobile device sensors, the computer program product comprising:
a non-transitory computer-readable medium having program instructions embodied therewith, the program instructions being executable by a processor of a computer that causes the computer to virtualize mobile device sensors by:
automatically recognizing by a first mobile device an available specific type of sensor on a second mobile device;
configuring an operating system of the first mobile device to allow an application program to accept data by proxy from the available specific type of sensor of the second mobile device;
establishing a trusted communication connection between the first and second mobile devices;
sending a control signal from the first mobile device to the second mobile device for controlling the available specific type of sensor on the second mobile device to generate sensor data;
receiving at the first mobile device the sensor data from the available specific type of sensor on the second mobile device generated in response to the control signal for operating of the available specific type of sensor; and
providing the sensor data received from the available specific type of sensor on the second mobile device by proxy to the application program requiring the operation of the available specific type of sensor.

15. The computer program product of claim 14, wherein the control signal is generated by the application program on the first mobile device.

16. The computer program product of claim 15, wherein the control signal is generated by the application program on the first mobile device requiring operation of the available specific type of sensor not on the first mobile device.

17. The computer program product of claim 15, wherein the control signal is generated due to the available specific type of sensor not operating on the first mobile device.

18. The computer program product of claim 15, further including coupling an operating system of the first mobile device with the application program requiring the operation of the available specific type of sensor such that the data from the available specific type of sensor is not required to be from a sensor on the first mobile device.

19. The computer program product of claim 18, wherein the coupling is provided by a virtual machine monitor running on the first mobile device such that the first mobile device is a host machine and the second mobile device is a guest machine.

20. The computer program product of claim 14, further including the first mobile device automatically recognizing one or more second mobile devices has being a trusted device and having the available specific type of sensor.

* * * * *